US007349765B2

(12) United States Patent
Reaume et al.

(10) Patent No.: US 7,349,765 B2
(45) Date of Patent: Mar. 25, 2008

(54) SYSTEM AND METHOD FOR MANAGING UTILITY CONSUMPTION

(75) Inventors: Daniel J. Reaume, Livonia, MI (US); Randall J. Urbance, Warren, MI (US); Craig A. Jackson, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 36 days.

(21) Appl. No.: 11/060,942

(22) Filed: Feb. 18, 2005

(65) Prior Publication Data

US 2006/0190139 A1 Aug. 24, 2006

(51) Int. Cl.
*H02J 13/00* (2006.01)

(52) U.S. Cl. ............ 700/295; 700/286; 700/291; 700/28

(58) Field of Classification Search ........ 700/291, 700/286, 295, 296, 297, 28; 705/412; 236/91 D
See application file for complete search history.

(56) References Cited

U.S. PATENT DOCUMENTS

| 5,548,522 A * | 8/1996 | Primlani ................ 700/286 |
| 6,349,883 B1 * | 2/2002 | Simmons et al. ........ 236/46 R |
| 6,681,155 B1 * | 1/2004 | Fujita et al. ............ 700/287 |
| 6,785,592 B1 * | 8/2004 | Smith et al. ............ 700/291 |
| 6,882,904 B1 * | 4/2005 | Petrie et al. ............ 700/295 |
| 2001/0005802 A1 * | 6/2001 | Arita et al. ............. 700/286 |
| 2001/0056315 A1 * | 12/2001 | Nagafuchi et al. ....... 700/286 |
| 2004/0024494 A1 * | 2/2004 | Bayoumi et al. ......... 700/286 |
| 2004/0138981 A1 * | 7/2004 | Ehlers et al. ............ 705/36 |
| 2005/0165511 A1 * | 7/2005 | Fairlie ................. 700/286 |

OTHER PUBLICATIONS

Bsac, UC Berkeley UC Davis, "California Energy Commission Demand Response", Edward Arens, Paul Wright, P.I.'s, http://www-bsac.eecs.berkeley.edu/programs/cecdr.html.
The California Institute for Energy and Environment, Research Opportunity Notices, Control and Communications Integration—Jun. 2004 (pdf 221 KB) "Demand Response: Passive Proximity Electric Sensing" (pdf 423 KB), Richard White (UC Berkeley), Demand Response Enabling Technologies Development Workshop, Jun. 10, 2004, http://ciee.ucop.edu/dretd/White%20June%2010,%202004%20Final.pdf.
Center for the Built Environment, "Demand Response Enabling Technology Project" http://www.cbe.berkeley.edu/research/briefs-demand.htm.
Center for the Built Environment, "Wireless Measurement and Control of the Indoor Environment in Buildings" http://www.cbe.berkeley.edu/research/briefs-wireless.htm.
University of California Office of the President, Microsoft Powerpoint—UCB Intro Final.ppt, DR Enabling Technology Development Project 1 "New Thermostat, New Temperature Node and New Meter Introduction", Gaymond Yee DR ETD Project Manager Jun. 10, 2004, http://ciee.ucop.edu/dretd/UCB_Intro_Final.pdf—423.5KB.

(Continued)

Primary Examiner—Kidest Bahta
Assistant Examiner—Charles Kasenge (57) ABSTRACT

A system, method, and apparatus are disclosed for managing utility consumption. An embodiment is disclosed for reducing peak demand for a utility by staggering requests for that utility. Another embodiment is disclosed in which sensors monitor utility consumption throughout a facility. Those items of equipment not in active use, but still drawing utility resources, are shut down after a predetermined interval. Another embodiment is disclosed in which storage and conversion technologies are used to offset peak demand and the associated peak demand costs.

17 Claims, 8 Drawing Sheets

OTHER PUBLICATIONS

"Measuring Current with MC Hall Effect Technology", Sensor Technology and Design, Nov. 2003, http://www.sensorsmag.com/articles/1103/29/main.shtml.

"Non-contact Current Measurement with Cobalt-Coated Microcantilever" S.M. Goedeke, S.W. Allison, P.G. Datskos, Sensors and Actuators A 112, 32, 2004, http://www.mnl.ornl.gov/publications.html.

Macmillan English Dictionary, Word of the Week Archive, "Smart Dust" http://www.macmillandictionary.com/New-Words/040723-smart-dust.htm.

ZigBee™, FAQ No. 9, "How does ZigBee compare to other wireless standards", http://www.zigbee.org/en/about/faq.asp.

Network WorldFusion "New frontier for wireless: Sensor networks", John Cox, Network World, Jun. 7, 2004, http://www.nwfusion.com/cgi-bin/mailto/x.cgi.

Dust Networks™, "Technology: Under the Hood", http://www.dustnetworks.com/technoloty/overview.shtml.

Crossbow, "Motes, Smart Dust Sensors, Wireless Sensor Networks" http://www,xbow.com/products/productsdetails.aspx?sid=3.

Ember "Wireless Semiconductor Solutions" http://www.ember.com.

"Fuel Cell Program" Our Commitments Case Studies, http://www.dow.com/commitments/studies/fuelcell/index.htm.

"Dow and GM Set Stage for Hydrogen-Powered Electricity", Our Commitments Case Studies, http://www.dow.com/commitments/studies/fuelcell/feature.htm.

Press Kit, Our Commitments Case Studies, http://www.dow.com/commitments/studies/fuelcell/press.htm.

"'Smart' buildings use light, water to save energy" by Ellen Simon, Associated Press, Posted by MontroseNeighborhoodCafe, Nov. 1, 2004.

* cited by examiner

SYSTEM AND METHOD FOR MANAGING UTILITY CONSUMPTION

TECHNICAL FIELD

The present disclosure relates generally to a system and method for managing utility consumption. More particularly it relates to a system and method for monitoring and controlling peak demand for a utility.

BACKGROUND OF THE INVENTION

Utility consumption often has costs above and beyond the flat rate paid for a unit of utility consumption. For example, during hot weather, electrical utility grids are overburdened by heavy air conditioner usage. When brownouts occur, electric motors and other equipment may be damaged. In order to have reserves available for periods of peak demand, utility companies build new plants or upgrade older plants to provide additional electric power generating capacity.

The costs incurred by the utility companies are passed on to consumers in the form of higher rates or surcharges. Utilities may include electricity, natural gas, chilled water, steam, and compressed air. Rate schedules for utilities may be set with two components, a flat rate for consumption, and an additional charge based on peak demand. Sometimes the additional charge to the consumer based on peak demand can amount to up to one-half of the total utility cost, even if the peak consumption accounts for only 10% of the entire consumption.

SUMMARY OF THE INVENTION

Accordingly, a system, method, and apparatus are disclosed for managing utility consumption. Also disclosed is an embodiment for reducing peak demand for a utility by staggering requests for that utility. In yet another embodiment, sensors monitor utility consumption throughout a facility. Those items of equipment not in active use, but still drawing utility resources, are shut down after a predetermined interval. In still another embodiment, storage and conversion technologies are used to offset peak demand and the associated peak demand costs.

BRIEF DESCRIPTION OF THE DRAWINGS

Referring to the exemplary drawings wherein like elements are numbered alike in the several FIGURES.

DETAILED DESCRIPTION

As discussed above, additional charges accrue for peak utility consumption. The system, method, and apparatus according to an embodiment disclosed herein may operate continuously or may manage utility consumption when particular criteria are met. These criteria may comprise: high utility consumption, growing utility consumption (i.e., utility consumption trending upward), scheduled utility consumption, or other causes. Scheduling of utility consumption may occur to meet conditions that vary with production plans, quality goals, or time of day.

It will be appreciated that the system, method, and apparatus disclosed herein has wide applicability, whether in a domestic (household) environment or in a manufacturing, governmental, educational, or other institutional or commercial environment.

Figure 9:
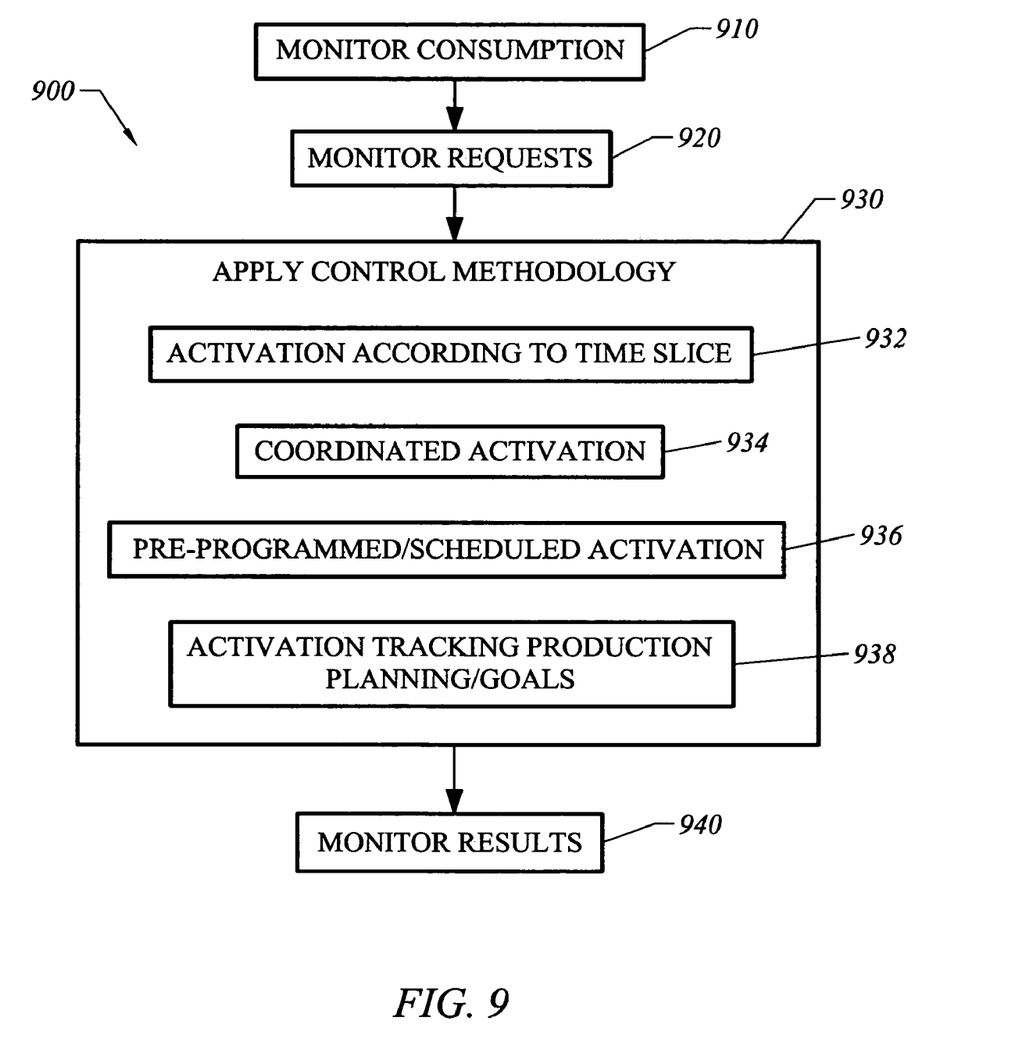
FIG. 9 shows a flowchart for staggering of utility loads.
Figure 10:
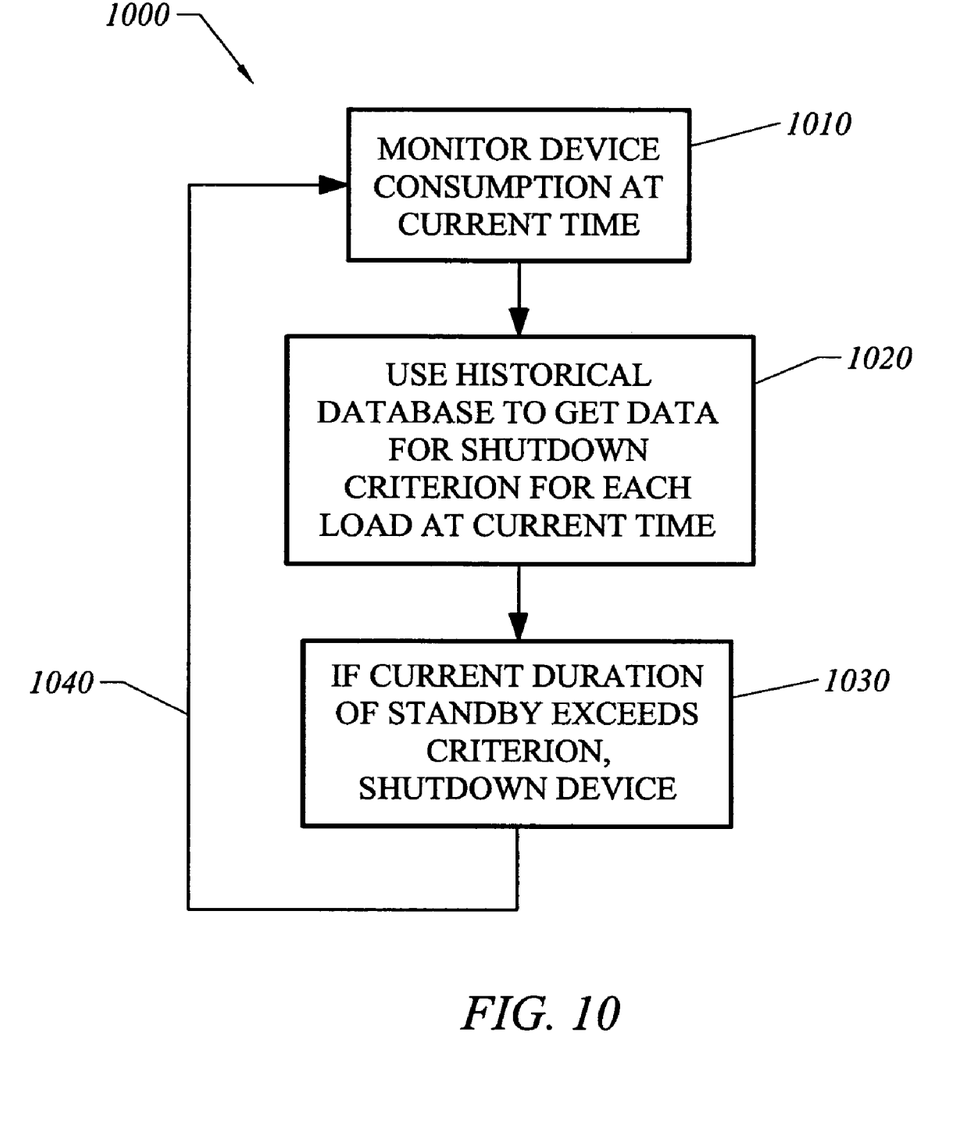
FIG. 10 shows a flowchart for monitoring and turning off idle devices.
Figure 11:
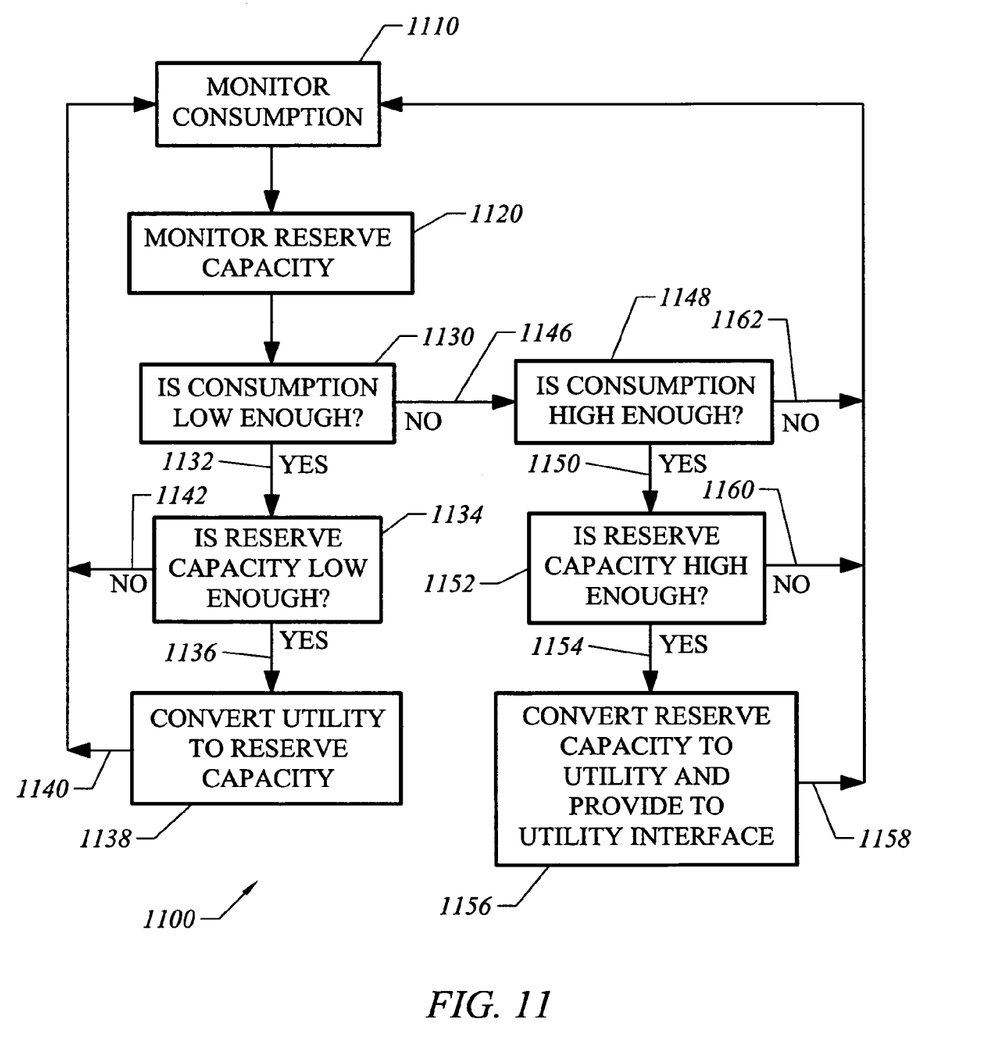
FIG. 11 shows a flowchart for managing storage and conversion of one utility into another, and back again.

Management of utility consumption may be formulated within the context of utility consumption optimization. Referring to the high level flow chart of FIG. 1, a strategy is provided by a method 100 according to particular criteria, parameters, and assumptions. By strategy is meant a coordination of utility draws by the loads under management by the system, method, and apparatus so as to achieve substantially optimal utility consumption within the constraints identified. FIGS. 9, 10, and 11, discussed in detail below, provide more details in implementing method 100 of FIG. 1. FIG. 9 refers to a staggering method. FIG. 10 refers to a shutdown method. FIG. 11 refers to a utility generation and storage method. The high level flowchart of FIG. 1 may implement steps as follows.

Figure 1:
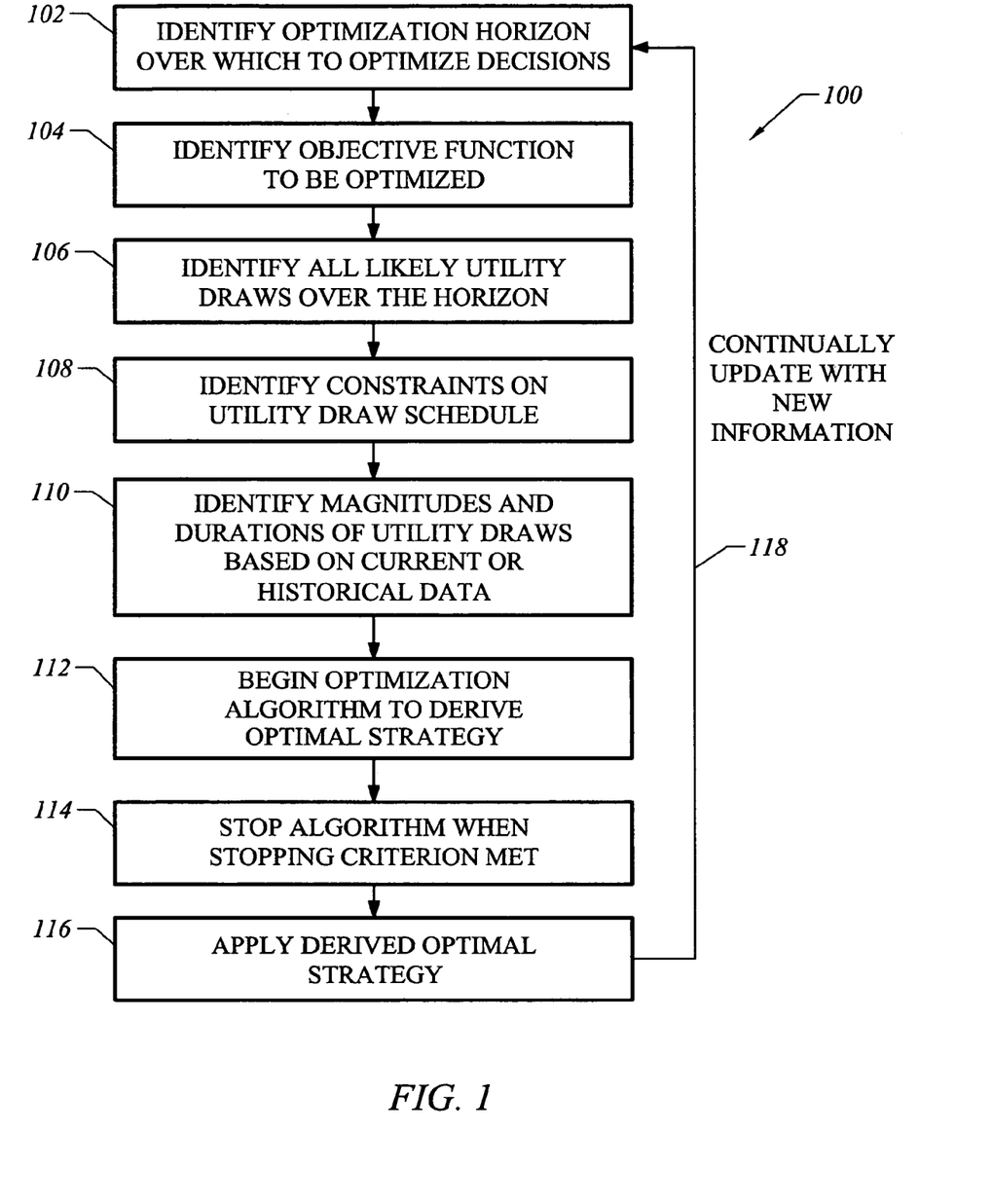
FIG. 1 shows a flowchart according to one embodiment for a method for managing utility consumption.

In a step 102, an optimization horizon over which substantially to optimize decisions about utility consumption is identified. By optimization horizon is meant a period of time over which the optimization is planned. This optimization horizon could be fixed. (e.g., always look 1 minute ahead), or could be dynamically adjusted and updated as conditions warrant. The advantage of this latter approach is that it is possible to identify a minimal optimization horizon such that the first decision will be substantially optimal despite end-of-study effects. The shorter the optimization horizon, the quicker it may be to find a substantially optimal solution.

In a step 104, an objective function to be optimized is identified. This may be a function to be minimized, such as peak utility demand, or a function to be maximized, for example, quality production rate. The objective function may even be a combination, e.g., a joint function of both peak demand and quality production rate.

In step 106, likely utility draws and their sources over this horizon are identified. Likely utility draws may be known from production planning data and schedules, for example. They may also be known from ambient conditions such as outdoor temperature or time of day.

In step 108, constraints on a utility draw schedule may be identified. These constraints may comprise, e.g., that utility draw A occur before utility draw B, or that utility draws C and D occur simultaneously.

There may be a step 110 in which magnitudes and durations of utility draws based on historical information are identified. For example, it may be known that weld gun A4, say, draws 230 watts of electrical power for 3 seconds. Step 110 may also comprise identifying magnitudes and durations of utility draws based on current information. For example, it may be known that a particular cutter tool is worn, and until replaced, requires 50% more electrical power than average. Furthermore, step 110 may also include identifying a time-varying signature or profile of a utility draw, such as a sudden initial spike at the start of a utility draw.

In a step 112 an optimization algorithm is applied to the problem thus constructed. One approach that may be used in an optimization algorithm is to model each utility draw as an independent agent and employ a Fictitious Play based algorithm to coordinate their behavior to minimize total consumption within performance constraints. Another possible approach is simply to adapt a commercial scheduling optimization package, such as those used for logistics planning. Another approach that may be used is to apply a simulated annealing optimization algorithm to the constrained problem. Yet another approach may utilize a genetic algorithm for optimization.

The optimization algorithm may be stopped 114 when a stopping criterion is met. Such a criterion may be, e.g., a time limit, an iteration limit, a user interrupt, or some other stopping criterion. Note that it is also possible to dynamically modify an optimization algorithm that is continuously running. In such an embodiment, the system and method may perturb the current best solution through the addition of new information.

The result of employing the optimization algorithm is a substantially optimal strategy for utility consumption. As was stated above, a strategy is a coordination of utility draws by the loads under management by the system, method, and apparatus so as to achieve substantially optimal utility consumption within the constraints identified. In an embodiment to be discussed further below in connection with FIGS. 8 and 11 in particular, the coordination applies also to interconversion of one utility to another and back again, as well as to conventional utility draws.

The next step 116 is to apply the substantially optimal strategy developed by usage of the algorithm. The optimization algorithm may be re-run, and its resultant substantially optimal strategy applied in an iterative fashion 118 to allow for continual update as conditions change or new situations arise.

Figure 2:
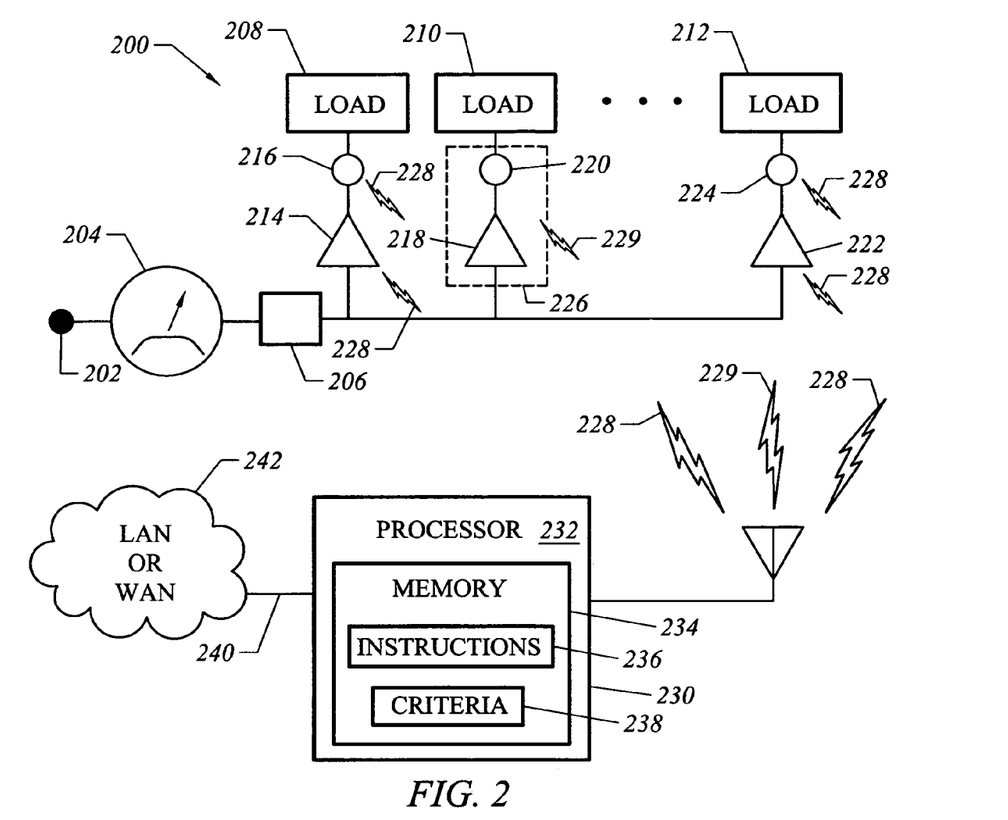
FIG. 2 shows a system according to one embodiment for managing utility consumption.

Referring to FIG. 2, a system and apparatus for substantially optimizing utility consumption according to an embodiment is shown at 200. Units of utility consumption provided by a supply 202 pass through a utility meter 204. In the case of electric power, a breaker box or other safety device for preventing dangerous overconsumption is provided at 206. For other utilities, a shut-off valve may be provided. Additional safety devices such as pressure relief valves may also be provided, as appropriate to a particular utility.

Devices consuming units of utility consumption are generally referred to herein as loads. Loads draw units of utility consumption in parallel, in general, as shown at 208, 210, and 212. In the embodiment shown in FIG. 2, a switch 214 in series with a sensor 216 for monitoring utility consumption is interposed between a load 208 and supply 202 of the utility. Similar switches 218, 222 and sensors 220, 224 are interposed between loads 210, 212, respectively, and supply 202.

Although shown with switch 214 interposed between supply 202 and sensor 216, this particular order may be changed, so that sensor 216 is interposed between supply 202 and switch 214.

Switch 214 may function to register user input for load activation. The user attempt to activate the load is then passed to a computing device 230 as an input to the utility management algorithm. Alternatively, at least for some loads, manual activation by a user may preempt control of the load's utility consumption by the computing device. Moreover, the system and method may provide for override capability for a load managed by an embodiment.

As shown, the switch 218 and sensor 220 may be packaged together in a unit 226. MEMS sensors or other technology may be utilized in embodiments to precisely monitor sources of consumption.

Switch unit 214 and sensor unit 216 may separately communicate 228 with computing device 230, which incorporates a processor 232 and memory 234. In another embodiment, switch and sensor unit 226 may communicate 229 with computing device 230. In still another embodiment shown in FIG. 7 discussed in detail below, a switch and sensor unit 226' may further include sufficient computing power to support distributed computing among the collection of switch and sensor units within a facility. Again referring to FIG. 2, communication 228 and/or communication 229 may use a wireless medium or wireless LAN. In another embodiment, a wired, fiber-optic, or other physical connection may provide a communications link between the computing device and the sensors and switches.

The set of switches 214, 218, and 222 are included in a wired or wireless network. This network may be connected, as shown in FIG. 2, to the computing device. The network may in addition, or even instead, provide for interconnection of the switches. Furthermore, the set of sensors 216, 220, and 224 are included in a network which, like the switch network, may be connected to the computing device. In another embodiment, the network may interconnect the sensors, with or without a connection to a separate computing device. It is contemplated that in embodiments without network connection of switches and/or sensors to a separate computing device, each switch and/or sensor comprises sufficient computing power so that the networked ensemble may comprise a self-organizing network within which it may execute the algorithms described herein.

Memory 234 includes instructions 236 and may include separate criteria 238 to provide direction for controlling utility consumption through sensor 216 and switch 214, for the load at 208, for example. In addition, a connection 240 to a facility network 242 may be provided. Network 242 may be a LAN or a WAN, and may provide access to, for example, productivity or production planning databases for coordination with productivity goals, as will be discussed further below.

Figure 3:
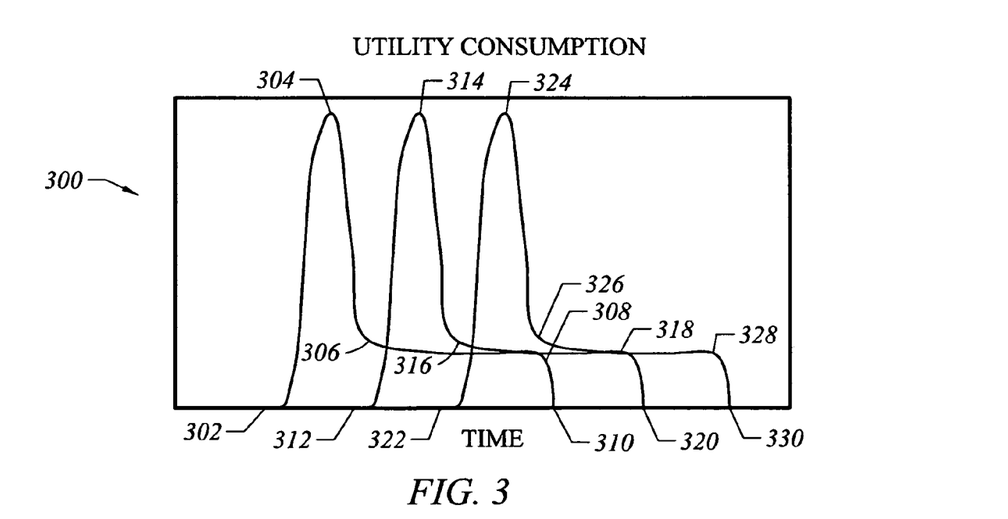
FIG. 3 depicts power consumption as a function of time for a set of devices which draw highest power at startup.

Turning now to FIG. 3, utility consumption as a function of time is sketched at 300 for a set of three devices, each drawing units of utility consumption at a high rate at its respective initial activation. Such devices may include electric motors, printer toner heating elements, compressors and hydraulic pumps, and some forms of electric lighting such as fluorescent lights and mercury and sodium vapor lights. Some steam and compressed air operated devices present their highest rate of utility consumption at startup as well, having to overcome static friction at startup as well as dynamic friction. Consumption peaks at startup may also be present in heating or cooling applications using e.g., steam or chilled water, respectively. In addition, because internal combustion engines may draw a rich fuel/air mixture at startup, such engines may be included among the devices under discussion in connection with this embodiment.

FIG. 3 shows a plot of utility consumption vs. time that may result according to the implementation of the steps of FIG. 1 and/or according to the system and apparatus of FIG. 2. In FIG. 3, a first device, for example, load 208 of FIG. 2, begins to consume utility at 302, and its consumption rises rapidly to a peak at 304. Soon it settles to a lower rate of consumption at 306, which lasts substantially until device shutdown at 308. Utility consumption by load 208 ceases soon thereafter at 310.

As further shown in FIG. 3, a second load, for example, load 210 of FIG. 2, begins to consume utility at 312, and its consumption rises rapidly to a peak at 314, then soon settles to a lower rate of consumption at 316, which lasts substantially until device shutdown at 318. Utility consumption by load 210 ceases soon thereafter at 320. A third device, for example, load 212 of FIG. 2, begins to consume utility at 322, and its consumption rises rapidly to a peak at 324, then soon settles to a lower rate of consumption at 326, which lasts substantially until device shutdown at 328. Utility consumption by load 212 ceases soon thereafter at 330.

Figure 4:
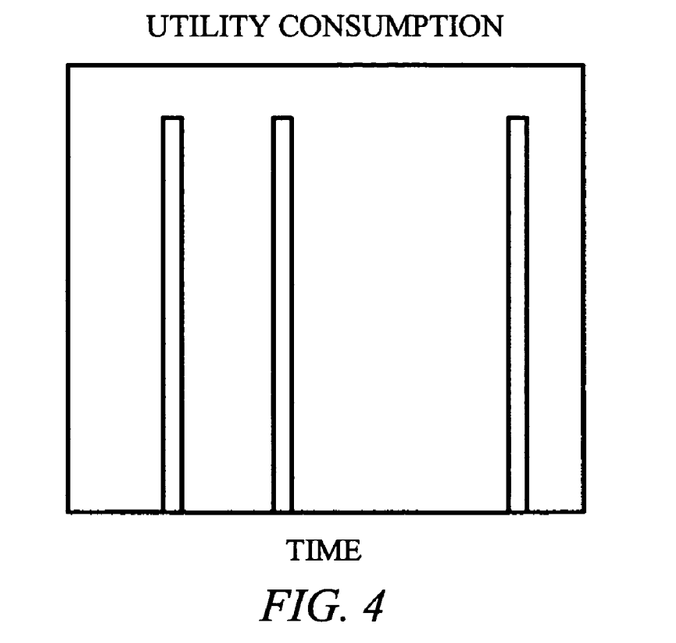
FIG. 4 shows power consumption for a device which draws high power, but operates only intermittently.

FIG. 4 shows an example of utility consumption for devices which draw high power, but only intermittently. Utility consumption by such devices can be managed in accordance with the embodiment as shown in FIG. 1 or FIG. 2. FIG. 4 shows utility consumption for three loads operated sequentially. As depicted, each load consumes utility at a high rate, but for a short interval. Coordination of the activation of each of the loads is provided so that no two are active simultaneously. Peak utility consumption rate due to the loads is reduced. A contemplated use of this embodiment is in the microscheduling of weld guns.

The coordination between load activations, and staggering of the onset of utility consumption by loads, as discussed in connection with FIGS. 3 and 4, may be accomplished in a number of ways. In one embodiment, each load is accorded a time slice at regular intervals. No utility consumption by a particular load may begin except at the start of its time slice. If utility consumption by the load is sought at any other time, utility consumption by the load is queued until its next time slice begins.

In another embodiment, the restriction of utility consumption by the load to a particular time slice occurs only if a high consumption criterion is met. This high consumption criterion may be defined in terms of utility consumption by the entire facility, utility consumption by a region of the facility, or utility consumption by one or more specific clusters of one or more loads.

In another embodiment, the restriction of utility consumption by the load to a particular time slice occurs only if utility consumption is trending upward and its average rate of increase over a specified time period exceeds a predetermined value. As with the high consumption criterion above, this trending criterion may be defined in terms of the rate of utility consumption increase by the entire facility, the rate of utility consumption increase by a region of the facility, or the rate of utility consumption increase by one or more specific clusters of one or more loads.

In another embodiment, utility consumption by a load is restricted if a high utility consumption criterion is met, and allowed otherwise, without regard to partitioning into time slices the availability of utility consumption to different loads.

In another embodiment, utility consumption by a load is restricted if utility consumption is trending upward as discussed above, and allowed otherwise, without regard to partitioning into time slices the availability of utility consumption to different loads.

In still another embodiment, activation of loads is coordinated through a computing device. This may be accomplished, for example, through an algorithm that takes into consideration each load's utility consumption requirement, both as to rate and duration, as well as an assigned priority for each load's activation.

In another embodiment, a protocol to control which loads are permitted to initiate utility consumption may be used. According to the protocol, loads wishing to consume the utility would be allowed to initiate consumption independently. The loads monitor the sensor network to determine if other loads begin utilizing the same utility concurrently. Although the number of loads that may use the utility is not generally fixed, limits may be imposed on the amount (e.g., in amperes or watts) and duration of utility consumption for individual loads, as well as total consumption due to all loads. When simultaneous consumption beyond the imposed limits is detected, a load may cease its own consumption, wait a randomized amount of time and try again later. These limits may be subject to fixed or dynamic priorities. For example, safety (e.g., building lighting) may have priority over production (e.g., weld guns), but production may trump comfort (i.e., HVAC). The protocol may be governed by a central computer (e.g., as in FIG. 2) or each load may have an intelligent controller (e.g., as in FIG. 7) which allows the loads to make intelligent decisions.

In yet another embodiment, staggered activation of a set of loads may be accomplished by way of pre-programming the staggered activation of the set of loads. In another embodiment, the pre-programmed staggering may employ an algorithm whose inputs may include production goals and/or data from a production planning database.

As with the high consumption criterion and the trending criterion discussed earlier, each of these embodiments may be practiced with regard to the entire facility, a region of the facility, or one or more specific clusters of one or more loads.

Figure 5:
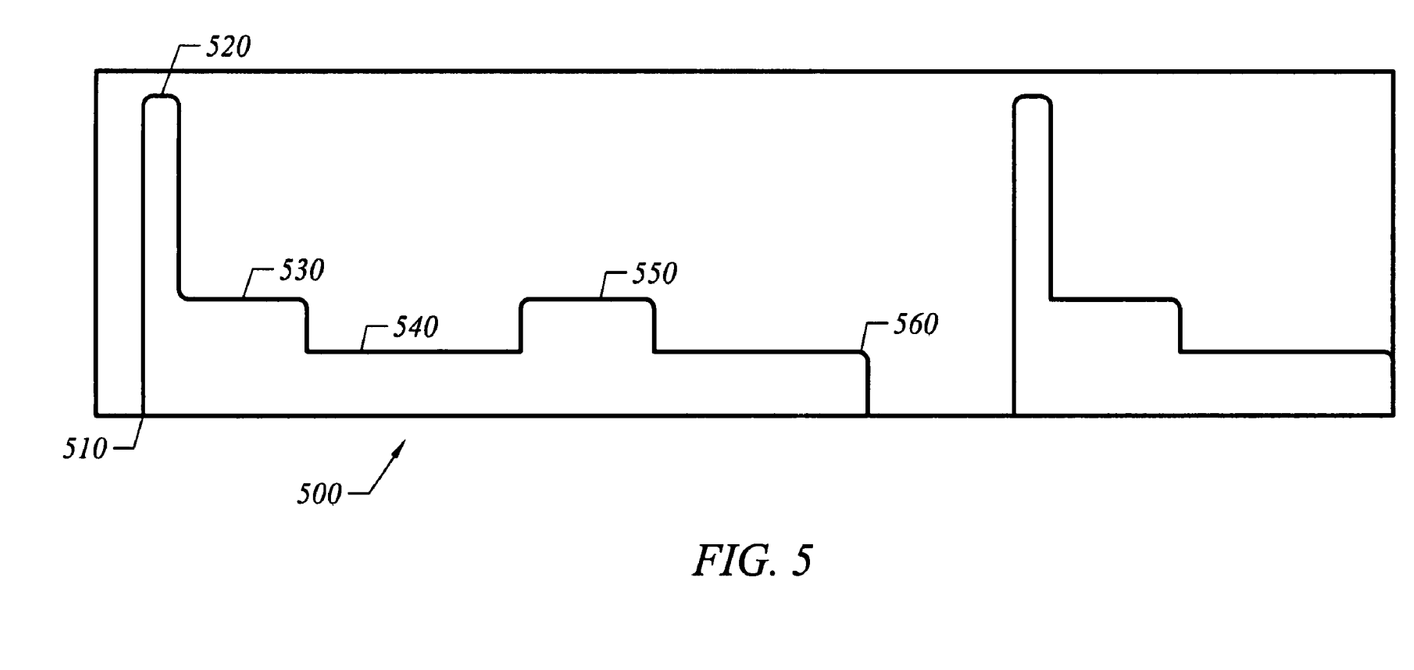
FIG. 5 depicts power consumption as a function of time for a device which draws its highest power at startup and has a standby mode.

FIG. 5 shows yet another example of utility consumption which may be managed in accordance with an embodiment as illustrated in FIG. 1 or 2. FIG. 5 shows a load which, upon "cold" startup, consumes utility at a high rate. During regular use, the load consumes utility at its nominal rate. Finally, after a period of non-use, the load is programmed to drop its consumption to a standby rate. Providing a standby rate for the load obviates having to "warm up" the load before each use, and avoids the high peak seen in FIG. 5. In this manner, a much smaller peak of utility consumption may take place prior to the next regular use, or may even be absent as shown in FIG. 5. Loads that may take advantage of a standby mode include printer toner heating elements, computer monitors, and internal combustion engines.

Sometimes, though, standby mode acts to drive utility consumption up. This can occur when the mean time between regular uses of the load exceeds the difference in the peak consumptions with and without the standby capability, divided by the rate of utility consumption during standby. In the embodiment shown in FIG. 5, the load is shut down completely after a predetermined time in standby mode, thus preventing utility consumption at even the standby rate.

Figure 6:
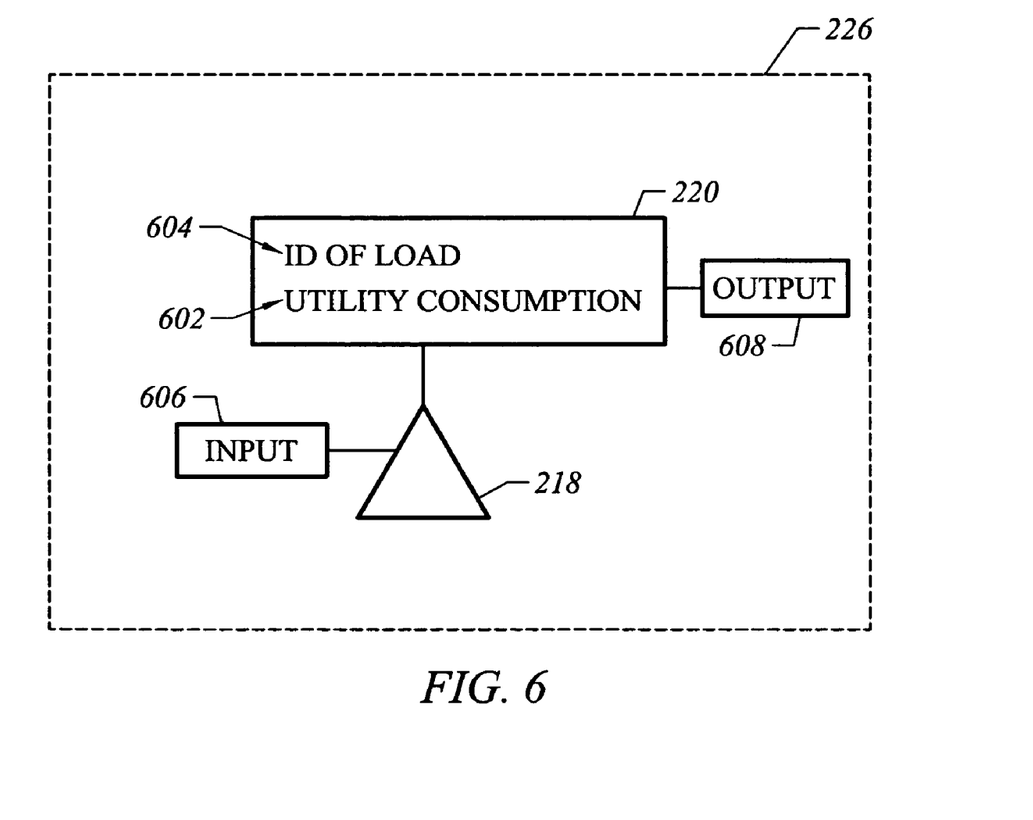
FIG. 6 shows a combined sensor-switch module according to an embodiment.

Referring now to FIG. 6, an embodiment 226 of a packaged switch 218 and sensor 220 is shown. Switch 218 is operable by a signal 606 from a computing device. In another embodiment, as discussed above, manual input may be provided for as well. Sensor 220 measures utility consumption 602, and is further encoded with an identification code 604 for its associated load. Output 608 of measured consumption 602 and ID 604 are provided to the computing device. Such provision may occur at scheduled intervals, upon request by the computing device, or upon initiation by the switch/sensor unit.

Figure 7:
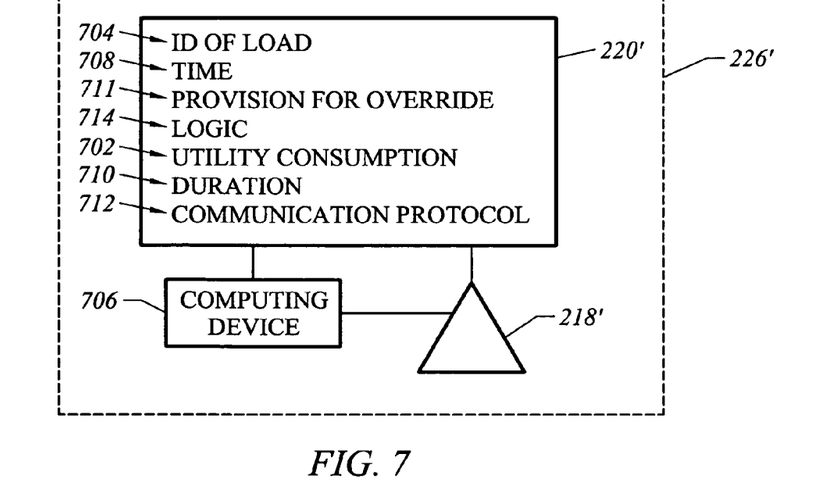
FIG. 7 shows a combined sensor-switch module according to another embodiment.

FIG. 7 shows another embodiment 226' of a packaged switch 218' and sensor 220'. Sensor 220' measures utility consumption 702 and is further encoded with ID 704 for its associated load. Computing device 706, in combination with sensor 220', provides for tracking the time 708 and duration 710 of utility consumption. The computing device also provides, with switch 218', provision for override 711 of staggering activation instructions under predetermined circumstances. Computing device 706 may also facilitate communication with other packages or with a separate computing device through a communication protocol 712. Logic 714 may be provided to implement these and additional functions as may be needed, for example, to satisfy industry standards on inter-device communication or to satisfy other standards. Sufficient logic and computing power may be provided in each package so that the network of switch/sensor units may comprise a self-organizing network.

Figure 8:
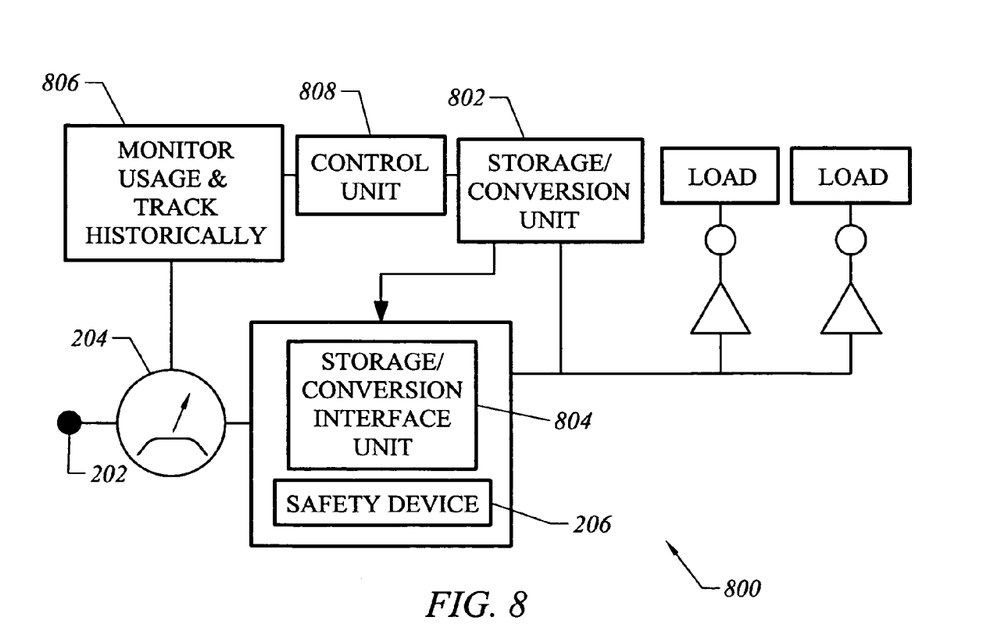
FIG. 8 shows an aspect of an embodiment with application to storage and conversion technologies.

Referring now to FIG. 8, an embodiment of a system and apparatus is shown in which staggering of utility consumption is accomplished using storage and conversion technology. For example, by generating electricity when possible, it may be stored for later use. Storage technology may comprise batteries for storage of electrical energy, pressure vessels for storage of gases, flywheels or other devices for storage of mechanical energy, and thermal masses for storage of heating or chilling capacity.

Conversion technology may comprise fuel cells for reversible interconversion of a fuel to electricity, rectifiers for conversion of alternating current (AC) to direct current (DC), inverters to convert DC to AC, motors and other actuators to convert electrical energy to mechanical energy, generators to carry out the conversion of mechanical energy to electrical energy, and heating and cooling units to convert a utility of one form into heating or chilling capacity.

In the embodiment 800 shown in FIG. 8, for clarity, some elements shown in FIG. 2 have been omitted. Units of utility consumption provided by a supply 202 pass through a utility meter 204. In the case of electric power, a breaker box or other safety device for preventing overconsumption is provided at 206.

A storage/conversion unit at 802 appears as a load to supply 202. A utility intertie or utility interface 804 ensures against backfeeding, in embodiments in which supply 202 is electrical. In FIG. 8, interface 804 appears in combination with the breaker box/safety device labeled 206 in FIG. 2.

A monitor unit 806 tracks consumption at the utility meter. Data from module 806 is provided to a control unit 808. Control unit 808 provides commands to storage/conversion unit 802 on whether to draw utility consumption units, and thus act as a load on supply 202.

Alternatively, control unit 808 provides commands to storage/conversion unit 802 to convert from stored form and deliver units of utility to utility interface unit 804. Control unit 808 may be configured to record data from module 806 in a database to track historical consumption. Control unit 808 may also be configured to retrieve historical data from the database.

In one embodiment, control unit 808 may command the storage/conversion unit to draw utility if facility consumption satisfies a criterion, e.g., if consumption is lower than a predetermined value, and if storage reserves are below a predetermined level. Control unit 808 may further command the storage/conversion unit to deliver utility if facility consumption satisfies a criterion, such as utility consumption exceeding a predetermined value, or rate of increase of utility consumption exceeding a predetermined value.

As mentioned above, FIGS. 9-11 are method flowcharts illustrating several ways to carry out steps of the flowchart of FIG. 1. FIG. 9 refers to a staggering method, FIG. 10 refers to a shutdown method, and FIG. 11 refers to a utility generation and storage method.

FIG. 9 shows a flowchart of a method for staggering of utility consumption in accordance with an embodiment at 900. Staggering of utility consumption is provided in this embodiment by monitoring of utility consumption 910. In another step, requests for utility consumption are monitored at 920. As described earlier in connection with FIG. 2, a switch 214 may provide for entry of a user request for utility consumption. In another embodiment, monitoring of a request for consumption of utility may comprise tracking of scheduled utility consumption for a load. Control methodology for staggering of utility consumption by loads is provided at 930. As earlier described, this methodology may comprise activation of a load according to allocation to a time slice 932, coordinated activation 934, pre-programmed or scheduled activation 936, and activation in accordance with production planning data or production goals 938. Resulting utility consumption may be monitored in a step 940.

FIG. 10 shows a flowchart of a method for monitoring and turning off idle devices in accordance with an embodiment 1000. In a step 1010, utility consumption at a current time is monitored for each load having a standby mode. At 1020, historical data from a database is used to derive a shutdown criterion for each load at the current time. For example, the mean time between user requests to activate a particular device may be derived from data retrieved from the database. Other statistical measures may be used to provide a criterion for load shutdown. In a step 1030, if a load is currently in standby mode, and the current duration of standby mode for that load exceeds the shutdown criterion for that load, the load is shut down. Continual monitoring 1040 of devices having standby mode may take place in this embodiment.

FIG. 11 shows a flowchart for a method for managing storage and conversion of one utility into another and back again, at 1100, in accordance with an embodiment having utility storage/conversion capability. In a step 1110, utility consumption by the facility is monitored. In another step 1120, reserve capacity that may offset peak utility consumption is monitored. In a step 1130, utility consumption is checked against a criterion to determine whether it is sufficiently low that utility units may be drawn for conversion into reserve capacity. If consumption is low enough 1132, then in a step 1134 available reserve capacity is checked to determine whether it needs replenishment, by meeting a criterion that reserve capacity is sufficiently low. If the criterion is satisfied 1136, then conversion of utility to reserve capacity takes place 1138. Continual monitoring of utility consumption by the facility is provided for at 1140. If at step 1134 reserve capacity is not low enough 1142 to warrant conversion of utility to reserve capacity, continual monitoring of utility consumption by the facility is provided for.

If at step 1130 utility consumption is not low enough 1146, then in a step 1148 utility consumption is checked to determine whether consumption is high enough to possibly warrant conversion of reserve capacity back to utility. If yes 1150, then at a step 1152 available reserve capacity is checked as to sufficiency. If reserve capacity is sufficient 1154, then in a step 1156 reserve capacity is converted to utility and provided to the utility interface 802. Continual monitoring of utility consumption by the facility is provided for at 1158. If at step 1152 available reserve capacity was not found sufficient, continual monitoring of utility consumption by the facility is provided for at 1160. If at step 1148, utility consumption is not high enough to warrant conversion of reserve capacity to utility, continual monitoring of utility consumption by the facility is provided for at 1162.

It will be apparent to one skilled in the art that testing of utility consumption and available reserve capacity against their respective criteria may take place in any order, one specific order being shown in FIG. 11. All such other embodiments are intended to be within the scope of this disclosure.

As described above, embodiments may take the form of computer-implemented processes and apparatuses for practicing those processes. Embodiments may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments can also take the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for managing utility consumption by one or more loads, the method comprising:
    identifying an optimization horizon over which to substantially optimize utility consumption decisions;
    identifying an objective function to be optimized;
    identifying likely utility draws over the optimization horizon, wherein the likely utility draws are identified from at least one of production planning data, production planning schedules, ambient conditions, historical utility draw information, current utility draw information, or time varying profiles of the utility draws;
    identifying constraints on the utility draws;
    utilizing an optimization algorithm to substantially optimize the objective function subject to identified utility draws and constraints within the optimization horizon to generate a derived substantially optimal utility consumption strategy; and
    outputting the derived substantially optimal utility consumption strategy;
    wherein substantially optimizing the objective function includes utilizing the optimization algorithm until a predetermined stopping criterion is met.

2. The method of claim 1, wherein optimization of the objective function comprises minimization of peak utility demand.

3. The method of claim 1, wherein optimization of the objective function comprises maximization of a joint function of both quality production rate and peak demand.

4. The method of claim 1, further comprising identifying magnitudes and durations of utility draws based on current data.

5. The method of claim 1, further comprising identifying magnitudes and durations of utility draws based on historical data.

6. The method of claim 1, wherein the optimization algorithm runs continuously and the method further comprises dynamically modifying the optimization algorithm.

7. A system for managing utility consumption, comprising:
    a first network of sensors in a facility to detect utility consumption in a plurality of loads within the facility;
    a second network of switches in the facility to regulate a supply of a utility to each of the plurality of loads within the facility;
    a computing device operatively connected to the first network and to the second network;
    wherein the computing device receives sensor data from the first network and operates switches of the second network according to an optimization method; and
    wherein the optimization method comprises:
        identifying an optimization horizon over which to substantially optimize utility consumption decisions;
        identifying an objective function to be optimized;
        identifying likely utility draws over the optimization horizon, wherein the likely utility draws are identified from at least one of production planning data, production planning schedules, ambient conditions, historical utility draw information, current utility draw information, or time varying profiles of the utility draws;
        identifying constraints on the utility draws;
        utilizing an optimization algorithm to substantially optimize the objective function subject to identified utility draws and constraints within the optimization horizon to generate a derived substantially optimal utility consumption strategy; and
        outputting the derived substantially optimal utility consumption strategy;
        wherein substantially optimizing the objective function includes utilizing the optimization algorithm until a predetermined stopping criterion is met.

8. The system of claim 7, wherein the method operates according to predetermined criteria, and the predetermined criteria comprise idle time for a load.

9. The system of claim 7, wherein the method operates according to predetermined criteria, and the predetermined criteria comprise production planning data.

10. The system of claim 7, wherein the method operates according to predetermined criteria, and the predetermined criteria comprise an amount of utility consumption in the facility.

11. The system of claim 7, wherein the method operates according to predetermined criteria, and the predetermined criteria comprise an averaged time rate of change of utility consumption in the facility.

12. The system of claim 7, wherein the method operates according to predetermined criteria, and the predetermined criteria comprise availability of a utility consumption time slice for a load.

13. The system of claim 7, wherein the method operates according to predetermined criteria, and the predetermined criteria comprise an amount of utility consumption in a predetermined set of loads in the facility.

14. The system of claim 7, wherein a load is a utility storage/conversion device.

15. The system of claim 7, wherein the network of sensors comprises a self-organizing network.

16. An apparatus for managing utility consumption in a facility, comprising:
- a first network of sensors in a facility to detect utility consumption in a plurality of loads within the facility;
- a second network of switches in the facility to regulate a supply of a utility to each of the plurality of loads within the facility;
- a computing device operatively connected to the first network and to the second network;
- wherein the computing device receives sensor data from the first network and operates switches of the second network according to an optimization method; and
- wherein the optimization method comprises:
  - identifying an optimization horizon over which to substantially optimize utility consumption decisions;
  - identifying an objective function to be optimized;
  - identifying likely utility draws over the optimization horizon, wherein the likely utility draws are identified from at least one of production planning data, production planning schedules, ambient conditions, historical utility draw information, current utility draw information, or time varying profiles of the utility draws;
  - identifying constraints on the utility draws;
  - utilizing an optimization algorithm to substantially optimize the objective function subject to identified utility draws and constraints within the optimization horizon to generate a derived substantially optimal utility consumption strategy; and
  - outputting the derived substantially optimal utility consumption strategy;
  - wherein substantially optimizing the objective function includes utilizing the optimization algorithm until a predetermined stopping criterion is met.

17. A computer-readable storage medium containing a set of instructions for a general purpose computer, the set of instructions comprising:
- instructions for identifying an optimization horizon over which to substantially optimize utility consumption decisions;
- instructions for identifying an objective function to be optimized;
- instructions for identifying likely utility draws over the optimization horizon, wherein the likely utility draws are identified from at least one of production planning data, production planning schedules, ambient conditions, historical utility draw information, current utility draw information, or time varying profiles of the utility draws;
- instructions for identifying constraints on the utility draws;
- instructions for identifying magnitudes and durations of utility draws based on available data;
- an optimization algorithm to substantially optimize the objective function subject to identified draws and constraints within the optimization horizon and derive a substantially optimal utility consumption strategy;
- instructions providing a stopping criterion for the optimization algorithm; and
- instructions for applying the substantially optimal utility consumption strategy;
- wherein substantially optimizing the objective function includes utilizing the optimization algorithm until the predetermined stopping criterion is met.

* * * * *